United States Patent [19]
Evans et al.

[11] Patent Number: 5,704,960
[45] Date of Patent: Jan. 6, 1998

[54] METHOD OF FORMING AN OPTICAL FIBER FOR REDUCED POLARIZATION EFFECTS IN AMPLIFIERS

[75] Inventors: Alan F. Evans, Beaver Downs; Daniel A. Nolan, Skyline Corning, both of N.Y.

[73] Assignee: Corning, Inc., Corning, N.Y.

[21] Appl. No.: 575,495

[22] Filed: Dec. 20, 1995

[51] Int. Cl.$^6$ .................................................. C03B 37/02
[52] U.S. Cl. ........................... 65/402; 65/390; 65/435; 65/444; 65/438; 385/28; 372/6
[58] Field of Search ........................ 385/28, 126, 122, 385/123, 124; 65/390, 402, 444, 432, 435, 438; 372/6

[56] References Cited

U.S. PATENT DOCUMENTS

| | | | |
|---|---|---|---|
| 3,912,478 | 10/1975 | Presby | 65/2 |
| 4,038,062 | 7/1977 | Presby | 65/21 |
| 4,184,859 | 1/1980 | Maklad | 65/2 |
| 4,274,854 | 6/1981 | Pleibel et al. | 65/2 |
| 4,291,940 | 9/1981 | Kawasaki et al. | 350/96.15 |
| 4,308,045 | 12/1981 | Miller | 65/3.11 |
| 4,426,129 | 1/1984 | Matsumura et al. | 350/96.33 |
| 4,505,729 | 3/1985 | Matsumura et al. | 65/3.11 |
| 4,509,968 | 4/1985 | Arditty et al. | 65/10.1 |
| 4,668,264 | 5/1987 | Dyott | 65/3.11 |
| 4,669,814 | 6/1987 | Dyott | 350/96.15 |
| 4,756,589 | 7/1988 | Brichena et al. | 350/96.15 |
| 4,828,592 | 5/1989 | Matsumura et al. | 65/3.11 |
| 4,859,223 | 8/1989 | Kajioka et al. | 65/3.12 |
| 5,133,794 | 7/1992 | Bachmann et al. | 65/3.12 |
| 5,291,501 | 3/1994 | Hanna | 385/126 X |
| 5,298,047 | 3/1994 | Hart, Jr. et al. | 65/3.11 |
| 5,309,530 | 5/1994 | Bergano et al. | 385/1 |
| 5,327,516 | 7/1994 | Chraplyvy et al. | 385/123 |
| 5,366,530 | 11/1994 | Weber | 65/403 |
| 5,418,881 | 5/1995 | Hart, Jr. et al. | 385/123 |

FOREIGN PATENT DOCUMENTS 8300232  1/1983  United Kingdom .

OTHER PUBLICATIONS

*Low–birefringence Single–Mode Optical Fibers: Preparation and Polarization Characteristics* H. Schneider, H. Harms, A. Papp, and H. Aulich, 1 Oct. 78, vol. 17, No. 19, Applied Optics.

*Polarization Optics of Twisted Single–Mode Fibers*, R. Ulrich and A. Simon, 1 Jul. 1979, vol. 18, No. 13, Applied Optics.

*Fabrication of Circularly Birefringent Single Mode Fibers*, S.C. Rashleigh, Navy Technical Disclosure Bulletin, vol. 5, No. 12, Dec. 1980.

*Origins and Control of Polarization Effects in Single Mode Fibers*, S.C. Rashleigh, Journal of Lightwave Technology, vol. 1, No. 2, Jun. 1983.

*Internal Rotation of the Birefringence Axes in Polarization–Holding Fibers*, M.J. Marrone, C.A. Villarruel, N.J. Frigo, and A. Dandridge, 1987, Optical Society of America. No Month.

*The Effect of Birefringence on Polarization Hole Burning In Erbium Dope Fiber Amplifiers*, V.J. Mazurczyk and C.D. Poole, Process Optical Amplifier Conference, ThB3–1, 77–79, 1994. No Month.

*Polarization Hole Burning In Erbium–Doped Fiber Amplifiers With Birefringence*, P.F. Wysocki, Process Optical Amplifier Confernece, ThB4–1, 1994. No Month.

*The Statistics of Polarization Dependent Losses'*, Symposium on Fiber Optics Measurements, N. Gisin, NIST, 1994. No Month.

*Primary Examiner*—Phan T. H. Palmer
*Attorney, Agent, or Firm*—Harris Beach & Wilcox, LLP

[57] ABSTRACT

A single mode optical fiber suitable for use in an amplified fiber optic system which includes an inner glass core doped with a rare earth element and an outer transparent glass cladding. The fiber exhibits a plurality of mode coupling sites formed at regular intervals along the length of the fiber which provides for a reduced DOP. The sites are formed by a twist at regular intervals along the fiber length by applying a torque to the fiber. The method of forming the fiber is also disclosed.

7 Claims, 7 Drawing Sheets

High Birefringence EDFA on Large Drum

High Birefringence EDFA on 1" Cylinder

Low Birefringence EDFA
Preform A

Low Birefringence EDFA
Preform B

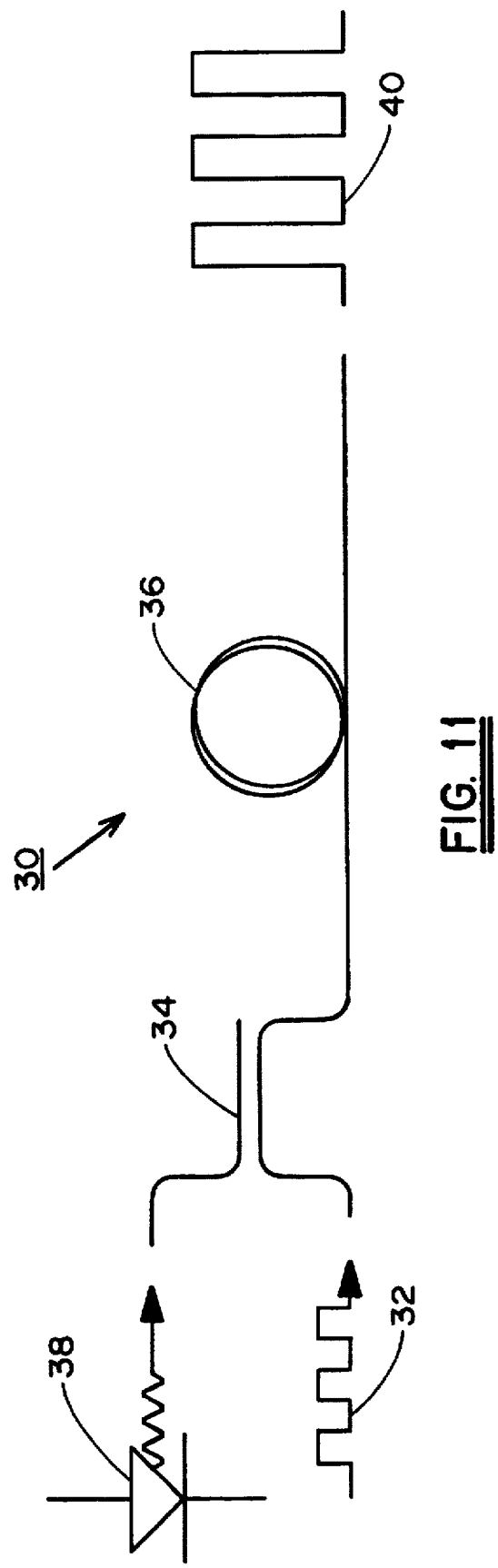

METHOD OF FORMING AN OPTICAL FIBER FOR REDUCED POLARIZATION EFFECTS IN AMPLIFIERS

BACKGROUND OF THE INVENTION

The present invention relates to rare earth doped fiber having a large number of spins and which is suitable for use in amplified fiber optic systems.

Polarization hole-burning (PHB) and polarization-dependent gain (PDG) are two anisotropic gain effects that limit erbium-doped fiber-amplifier (EDFA) transmission systems of the prior art. While this is a relatively small effect in a single amplifier, it seriously reduces the signal-to-noise ratio in long haul, e.g., transoceanic systems because of the large number of cascaded EDFAs.

Polarization-hole burning occurs when a saturating light signal robs gain from any weaker light signal in the fiber with the same polarization as the stronger signal. As a result, the polarization orthogonal to saturating light signal experiences an enhanced (anisotropic) gain, $\Delta G$. In fiber-amplifier transmission systems, randomly polarized amplified spontaneous emission (ASE) noise is present along with the gain saturating data signal. The ASE component orthogonal to the signal polarization experiences higher gain at each amplifier and grows faster than predicted. Since amplified systems usually operate in gain compression with constant amplifier output power, the fast growing ASE noise robs power from the data signal and the signal-to-noise ratio drops.

Polarization-dependent gain, on the other hand, is an anisotropic gain caused by the pump lightwave polarization. Erbium ions within the random distribution of orientations that are aligned along the same axis as the pump polarization are preferentially excited. Light with the same polarization de-exites these ions to experience excess gain in comparison to other polarizations. This also degrades the system performance.

Polarization properties of the incident light and within the amplifier gain can have a dramatic effect on PHB and PDG. The PHB effect was recently illustrated in highly birefringent erbium-doped fiber as reported by V. J. Mazurczyk and C. D. Poole, "The Effect Of Birefringence On Polarization Hole Burning In Erbium Dope Fiber Amplifiers," Proc. Optical Amplifier Conference, ThB3-1, 77–79, 1994. As shown by the authors, FIG. 1 illustrates the difference in gain for a probe signal polarization parallel vs perpendicular to a saturating signal as a function of the signal launch angle in a highly birefringent fiber. According to the bulk amplifier model, a maximum in gain anisotropy is expected for linear polarization and no anisotropy for circular polarization. Therefore, when the signal is launched along one of the birefringent axes ($\theta=0°$ or $90°$) it stays linearly polarized and the greatest gain difference occurs. At $45°$, the signal evolves through the greatest range of polarization states and averaging of the local differential gain throughout the amplifier reduces the overall gain difference. Randomizing the birefringence (as shown in FIG. 2 by winding the MgMy birefringent fiber of FIG. 1 on a 1" diameter dram) randomizes the polarization evolution and reduces $\Delta G$. It is well known that conventional EDFAs have low birefringence (beat length of a few meters) so that random birefringence lowers the launch polarization dependence on gain even more (FIGS. 3 and 4). In fact, P. F. Wysocki, "Polarization hole-burning in erbium-doped fiber amplifiers with birefringence," Optical Amplifier Conference, 80–82, ThB4-1, 1994. has quantified this dependence on degree of linearity (DOL) by the following equation:

$$\Delta G_a(dB) = DOP^a \left[ \frac{\Delta G_{MAX}(dB)}{L} \int_0^L (DOL_{pol})^2 dz \right] \quad (1)$$

In the above equation, DOP is the degree of polarization, DOL is the degree of linearity, L is the fiber length, and a is 1 or 2 for the partially or entire polarized portion of the signal respectively. The degree of linear polarization, DOL will average to ⅔ when integrated over the entire Pointare sphere. This is because two polarized waves will exhibit linear through circular states of polarization as the faster polarization passes by the slower polarization. This will occur many times in a typical erbium doped fiber, as discussed in the Wysocki Article.

The degree of polarization, DOP is defined using the "principal states of polarization." It is this parameter that is the subject of the present invention. The principal states refer to the polarization eigenfunctions (i.e., eigenpolarization) and in a straight elliptical fiber these states have eigenpolarizations along with the major and minor axis. These eigen-polarizations remain constant throughout the fiber, whereas the signal states of polarization traverse the Poincare sphere. In a twisted-elliptical fiber, for example, the eigenpolarizations are functions of the major and minor axis as well as the twist rate. One approach to reducing the DOP is by scrambling the polarization at the transmitter. This, however, has the disadvantage of requiring a costly active component to scramble the polarization.

The present invention is directed to minimizing the polarization dependent gain, $\Delta G$, in equation 1, by minimizing the DOP. The DOP is defined by N. Gisin, in 'The Statistics of Polarization Dependent Losses', Symposium on Fiber Optics Measurements', NIST, p 193–196, 1994, for example, as:

$$DOP = |M| \quad (2)$$

where $|M|$ is related to the stokes parameters, $S_1$, $S_2$, and $S_3$: $M=(S_1^2+S_2^2+S_3^2)^{1/2}/S_o$ and $S_o$ is the total power. The vector M is related to the mixture of the two orthogonal polarization state because "unpolarized light can be considered as an equal mixture of orthogonal polarization states." The DOP can be then forced to zero by ensuring that there is equal power in both orthogonal polarizations.

SUMMARY OF THE INVENTION

The present invention is directed toward eliminating polarization hole burning and polarization dependent gain in amplified fiber optic systems. This is accomplished by minimizing the DOP by creating a large number of polarization mode coupling sites within the fiber that cause equal population of the two orthogonal states of polarizations. The creation of a large number of polarization mode coupling sites within the fiber ensures a high probability that equal populations of the polarization eigenstates will occur in a statistical sense as the light propagates down the doped fiber. Increased polarization mode coupling of the input signal will reduce polarization hole burning; increased mode coupling of the pump laser light will reduce polarization dependent gain.

In the present invention, spinning or twisting a single mode rare earth doped fiber through a range of rotation rates as shown in FIGS. 7–10, and alternating the direction of rotation introduces the necessary coupling between orthogonal polarization modes. This can be achieved in the fiber drawing process by spinning in a prescribed way so as to induce several if not many polarization mode coupling sites. The rotation rate is determined by the fiber birefringence, and the number of reversal rates is determined by the desired number of polarization mode coupling sites. Since the local birefringence within a segment of the fiber is unknown and can vary, a range of rates and reversal lengths rather than a fixed constant value is desired. Spinning of transmission fiber for reducing polarization mode dispersion is well known, while in the present invention, spinning of the amplifier fiber reduces two unrelated polarization effects.

It is well known that spinning or twisting fiber in a continuous or clockwise and counterclockwise direction can be used to reduce polarization mode dispersion, see for example Ulrich and Simon (*Polarization Optics of Twisted Single Mode Fibers*, Applied Optics Vol 18, No. 13, Jul. 1, 1979) and also Payne et at. (PCT Application No. 83/00232) and also Hart et al. (U.S. Pat. No. 5,298,047 and 5,418,881). Twisting in one direction reduces the time delay differences between the two polarization modes as the light propagates down the fiber as explained in Payne. Polarization mode coupling which results from twisting or spinning in both directions can be used to compensate the time delay differences. This is explained in Ulrich and Simon on p2250. The distance over which this mode exchange takes place can be rather large, for example, tens or even hundreds of meters. In fact, Ulrich and Simon propose that it can be done once in the middle of the transmission span. Little has been published as to how often this exchange should occur, but it should occur before random coupling effects cause mode mixing which eliminate the possibility of proper mode mixing for compensation.

With respect to PHB and PDG, the prior art is silent with respect to how spinning or twisting will minimize or even address these effects. The formulas developed in Hart et at. and in Payne et at. for PMD are not applicable for PHB and PDG. For these two phenomena, proposed mode coupling in the present invention is used to prevent the worse case situation where incident light in an EDFA fiber remains in that fiber in one polarization eigenstate as it propagates down the entire length of the fiber. By causing many polarization mode coupling sites in the fiber, it is ensured statistically that this worse case situation does not happen. In the present invention, these mode coupling sites occur at intervals of ½ meter or less. The spin rates are then dictated by the teachings developed by Ulrich and Simon.

Additionally, this polarization mode coupling effect may be further enhanced by fabricating a preform with a small but finite amount of birefringence through either form ellipticity or stress. In order that the birefringent length be known and therefore be better able to specify the spin and reversal lengths, we can fabricate the fiber with a finite birefringence. This birefringence can be added by forming the fiber with a small ellipticity or stress. Formulas for how ellipticity and stress effect birefringence are developed by Rashleigh (*Origins and Control of Polarization Effects in Single Mode Fibers*, Journal of Light Wave Technology, Vol. 1, No. 2, June 1983). Finite birefringence has at least two advantages. First, the finite-birefringence, doped fiber would be insensitive to additional twist birefringence and unintentional mode coupling caused by its tight coiling in the amplifier package. Second, a finite birefringence would dominate unintentional birefringence introduced during the fiber fabrication process. Hence, the required spin rate and reverse length would be clearly defined.

BRIEF DESCRIPTION OF THE DRAWINGS

FIG. 11 is a schematic illustration of one embodiment of using optical fiber of the present invention in a rare earth doped fiber amplifier.

DETAILED DESCRIPTION OF THE INVENTION

Figure 1:
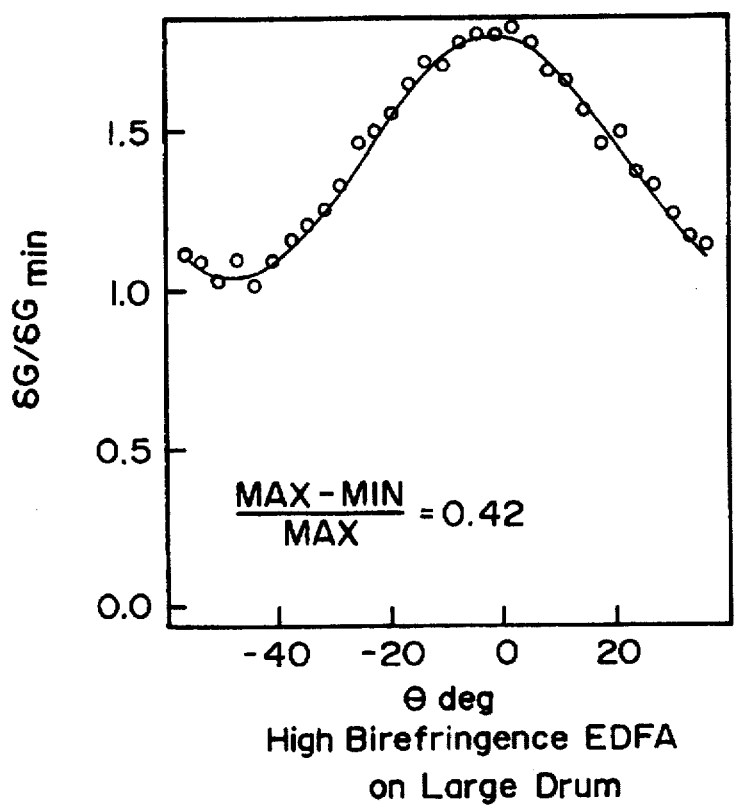
FIGS. 1–4 illustrate EDFA's of the prior art illustrating polarization hole burning or various birefringence and deployment.
Figure 2:
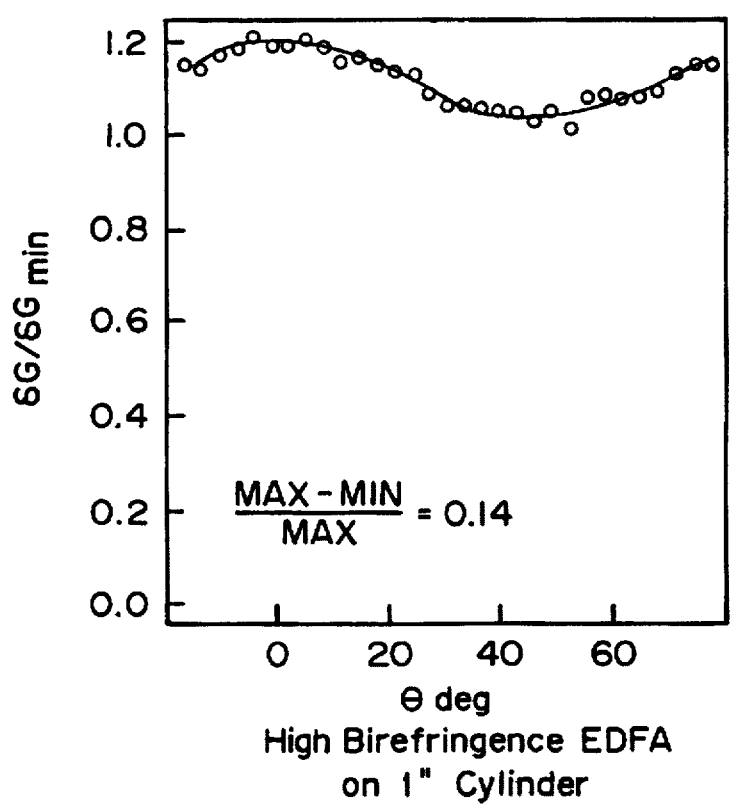
Figure 3:
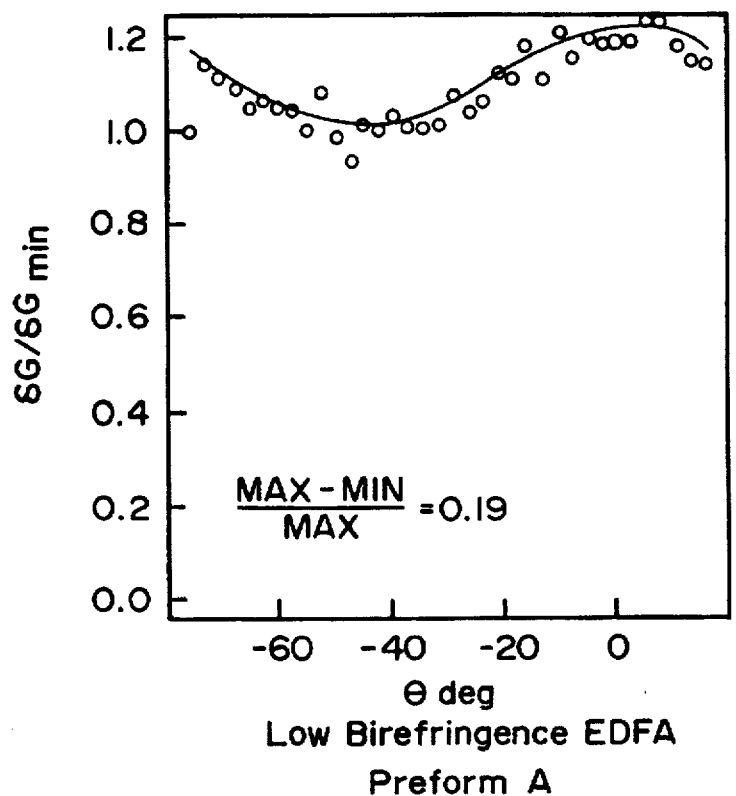
Figure 4:
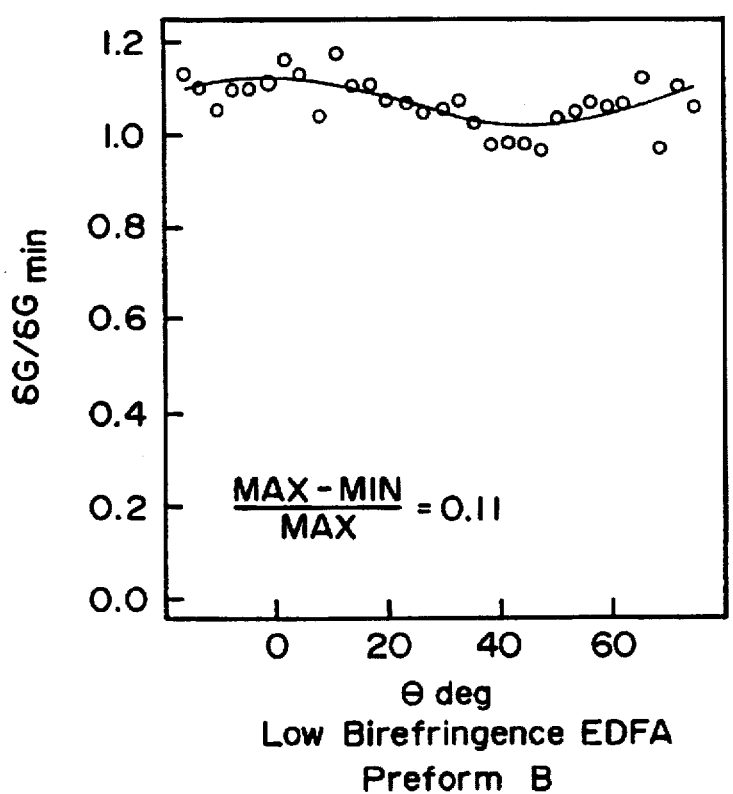
Figure 5:
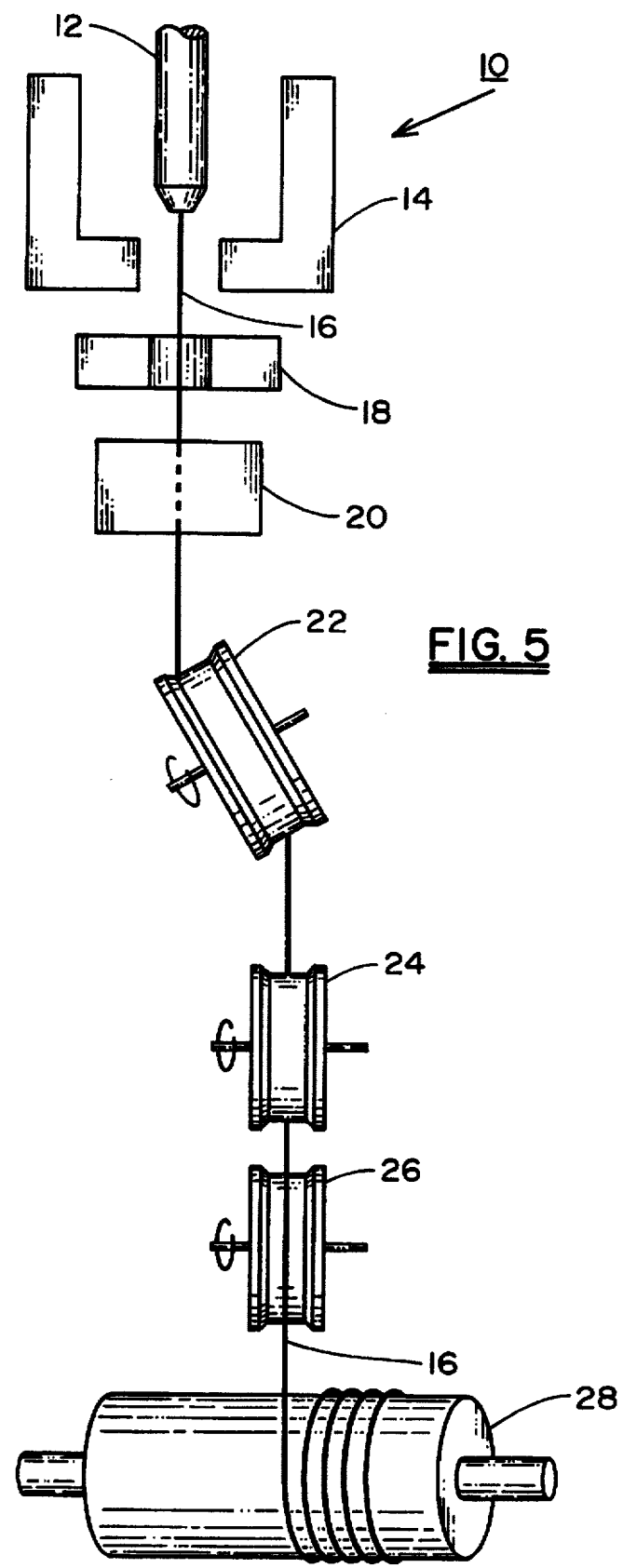
FIG. 5 is a schematic illustration of a fiber drawing apparatus suitable for use in carrying out the present invention.

The present invention is illustrated with reference to the drawings where FIG. 5 is a schematic representation of the fiber drawing apparatus 10 suitable for use in carrying out the present invention. As shown in FIG. 5, a preform 12 is mounted vertically in the furnace 14 and heated until molten glass can be pulled from the preform in the form of a fine fiber 16. The fiber diameter is measured at a monitoring station 18 and the fiber then coated at a coater station 20 with a protective plastic layer (not shown) as it is continuously pulled from the preform. In the present invention, the fiber then passes through a series of rollers 22, 24 and 26 at least one of which (22) is rotated to cause a torque to be applied to the fiber at regular intervals alternately in a clockwise and counterclockwise direction as more fully described herein. After passing roller 26, the fiber is wound around storage drum 28.

Figure 6:
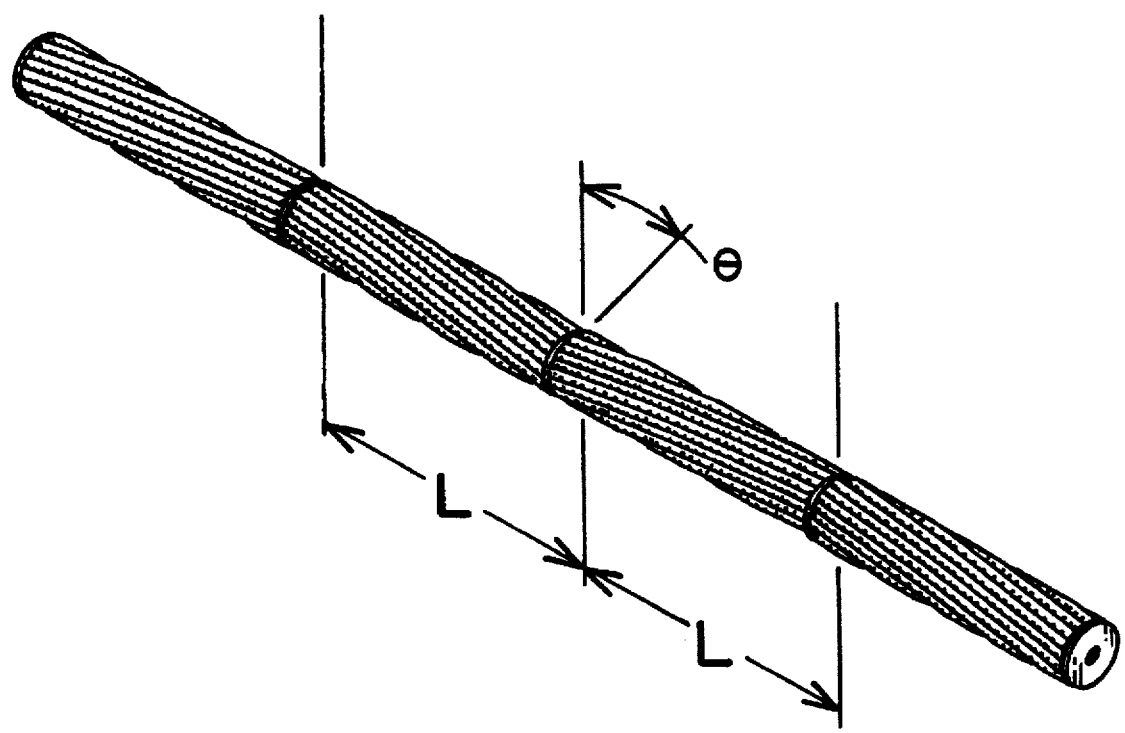
FIG. 6 is a perspective view of a segment of an optical fiber made by the present invention.

The fiber drawing portion of the schematic described in FIG. 5 represents apparatus well known to those skilled in the art. The resultant fiber formed from the process illustrated in FIG. 5 is depicted in FIG. 6 which is a perspective view of a segment of a length of optical fiber made by the present invention. This fiber has alternating lengths of spin or twist which have been formed by applying torque alternately in the clockwise and then in the counterclockwise direction or visa versa, as described above. The spin or twist of this fiber is uniform in each alternating length. The reversal length is denoted as L and is the length, in meters, between spins in the opposite direction. The angle, $\theta$ in degrees or radians, denotes the total rotation the fiber undergoes in one direction before the sign of the rotation changes and the fiber spins or twists in the opposite direction. As shown in FIG. 6, a fiber segment 50 of the present invention is illustrated having an inner doped core 54 and a transparent outer glass cladding 52. For the fiber depicted in FIG. 6, with constant spin which alternates in the clockwise and counterclockwise directions, the spin rate in twists/meter is easily defined as $\theta/(360°\times L)$ if the angle is in degrees or $\theta/(2\pi\times L)$ if the angle is in radian. More generally, the fiber can have nonuniform twist throughout its length. The parameters, $\theta$ and L, have the same definition but the spin rate becomes locally defined and can change value within a very small distance. The angle $\theta$ may vary from about 60° to 360° where 360° is a complete rotation. In some cases, 1 to 5 complete rotations may be employed. The local spin rate is related to the ratio of the instantaneous angle of rotation change to an infinitesimal length of fiber. In calculus notation, the local spin rate is $1/360$ or $1/\pi$ multiplied by $d\theta/dL$.

U.S. Pat. Nos. 5,298,047 and 5,418,881 teach prior art techniques and apparatus which may be used in the present invention whereby torque can be applied by guide roller means causing the guide rollers to oscillate about an axis which is substantially normal to the fiber drawing direction and normal to the roller rotation direction. These references are incorporated herein by reference. In addition, published PCT application WO 83/00232 entitled "Optical Fibers And Their Manufacture," and M. J. Marrone et al. (*Internal Rotation of the Birefringence Axes In Polarization Holding Fibers*, 1987 Optical Society of America) also teach prior art techniques and apparatus for providing twists at regular intervals in an optical fiber. The torque to provide the twist may be accomplished either by rotating the preform or by the manipulation of guide rollers as taught by the prior art. U.S. Pat. Nos. 4,509,968 and 4,308,045 also provides a device and method for impressing torsional stresses on a fiber which may be used in providing the spin or twist in fiber of the present invention and is incorporated herein by reference.

Figure 7:
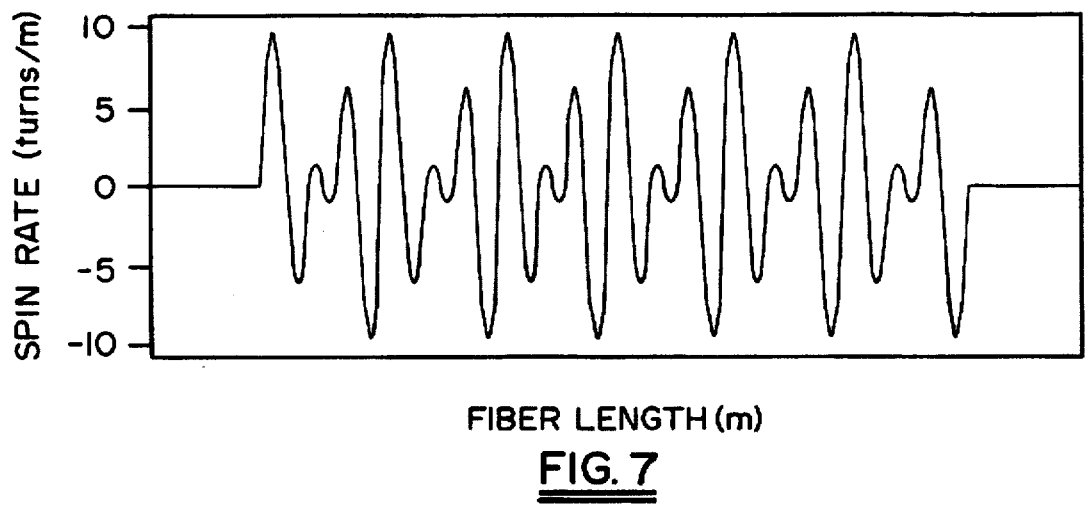
FIGS. 7–10 illustrate various spin rates as a function of fiber length for making optical fiber of the present invention.
Figure 8:
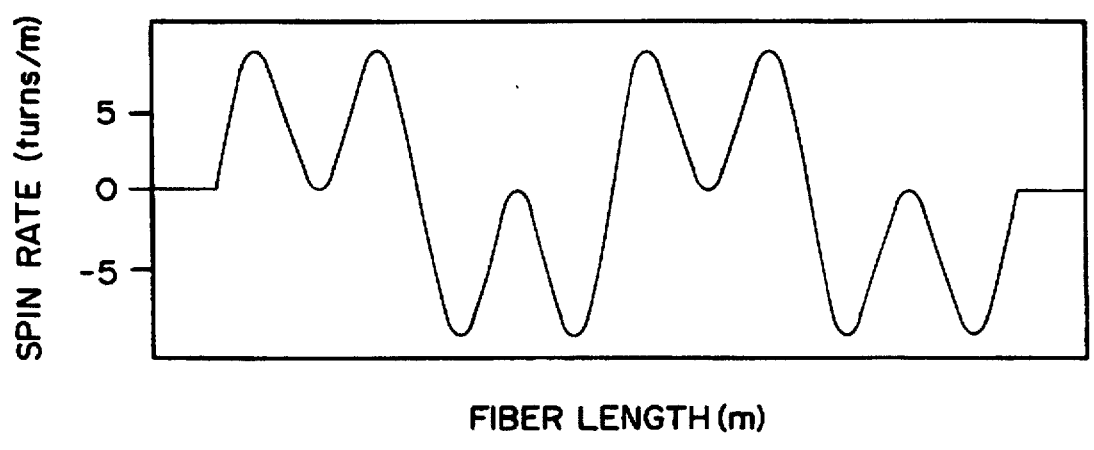
Figure 9:
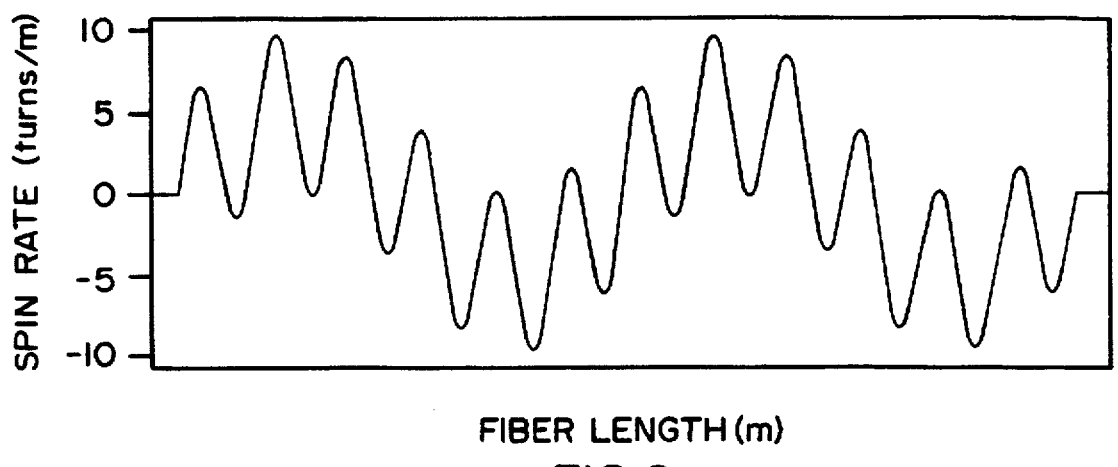
Figure 10:
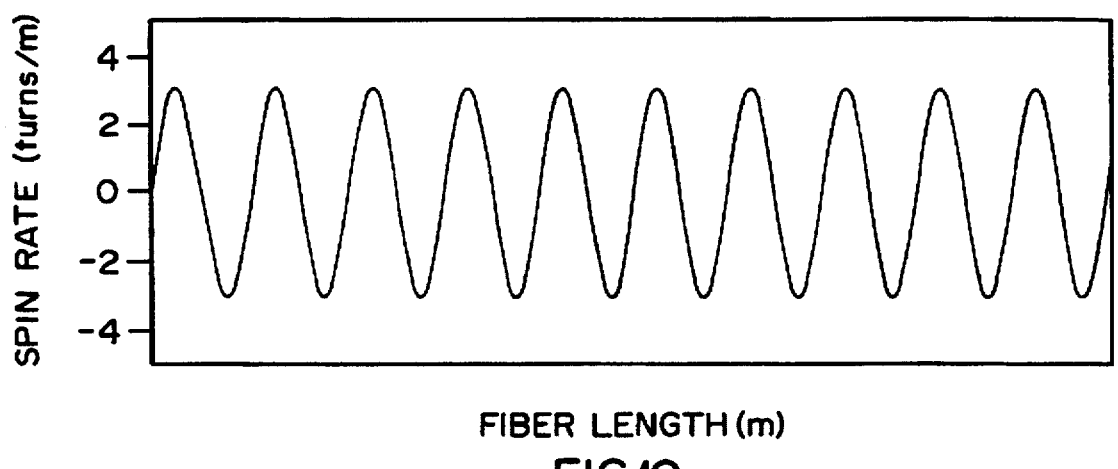

FIGS. 7–10 illustrate various spin rates as a function of the fiber length for use in the manufacture of optical fibers of the present invention. The most basic spin rate change along the fiber is illustrated in FIG. 10. Any spin function can be written as a linear superposition of constant and sinusoidal functions as illustrated in FIGS. 7–9. As previously described and illustrated in FIG. 6, the desired reversal length, L, is dependent on the desired number of the mode coupling sites, and the spin rate is dependent upon the fiber birefringence. The reversal length defines the period of the sinusoidal function in FIG. 10. However, the fiber must support mode-mixing sites at both the signal wavelength and the pump laser wavelength. Because the fiber birefringence is dependent on wavelength, the spin profile needs to be a superposition of two sinusoids, one to create mode-mixing at the signal wavelength and one to create mode-mixing at the pump laser wavelength. FIGS. 7–9 are spin functions created by mixing a fundamental sinusoid with different higher order harmonics. Therefore, in order to account for the variations in birefringence of the optical fiber, various other spin rates may be considered and used as described above. As the spin amplitude and frequency change, phase matched or nearly matched mode coupling can occur in a broad band of fiber birefringence. As previously stated above, the spin rate along the fiber length is largely dependent upon local birefringence. Rare earth doped single mode fibers of the present invention may be made using any one of the above spin rates or spin rates analogous thereto may be employed depending upon the birefringence of the fiber being processed.

FIG. 11 is a schematic illustration of a rare earth doped fiber amplifier 30 which utilizes optical fiber produced by the present invention. In FIG. 11, a weak optical input signal 32 enters from the left passing through a wavelength division multiplexing coupler 34 which combines it with light from an external pump source 38. The pump and the signal light then enters one end of an erbium doped fiber 36, typically 20 to 30 meters long. The light from the pump excites the dopant atoms raising them to a higher energy level. Light at the signal wavelength stimulates the excited atoms to deexcite down to their Found state and emit the excess light energy at the signal wavelength, the amplified signal 40 is then directed to the output fiber.

The present invention is applicable to any single mode rare earth doped fiber, but erbium-doped fibers are used in the particular embodiments described herein. Typically these fibers have an outer diameter of about 125 microns and an inner core having a diameter of about 5 to 6 microns.

The fiber core and cladding are preferably made of high purity fused silica. In general, several twists per meter, as dictated by the birefringence of the fiber, are impressed upon the fiber with an alternative torque being applied at intervals of about ½ meter or less. Typically, about 1 to 4 twists per meter are satisfactory.

While the present invention has been particularly shown and described with reference to the preferred mode as illustrated in the drawings, it will be understood by one skilled in the art that various changes in detail may be effected therein without departing from the spirit and scope of the invention as defined by the claims.

What is claimed is:

1. A method of forming a single mode optical fiber suitable for use in an amplified fiber optic system which comprises:
    (a) providing a preform having a rare earth doped inner glass core surrounded by a transparent outer glass cladding;
    (b) drawing a fiber from said preform in a conventional manner;
    (c) the improvement comprising imparting a plurality of twists at regular intervals of about ½ meter or less along the length of the fiber whereby a plurality of mode coupling sites are formed which provide for a reduced PHB, PDG and DOP.

2. A method of forming an optical fiber suitable for use in an amplified fiber optic system which comprises:
    (a) providing a preform having an inner glass core doped with a rare earth element said core being surrounded by a transparent outer glass cladding;
    (b) drawing a fiber from said preform in a conventional manner;
    (c) the improvement comprising imparting a plurality of twists at regular intervals of about ½ meter or less along the length of the fiber whereby a plurality of mode coupling sites are formed which provide for a reduced polarization hole burning, polarization dependent gain and degree of polarization (PHB, PDG and DOP).

3. The method of claim 2 in which the preform is provided with a finite degree of ellipticity.

4. A method of making an optical fiber comprising
    (a) providing an optical fiber preform having an inner glass core doped with a rare earth element, and an outer transparent glass cladding;
    (b) heating at least a portion of said preform; and
    (c) drawing optical fiber from the heated preform such that a spin is impressed on the fiber; wherein
    (d) step c) comprises applying a torque to the fiber, said torque causing the fiber to undergo rotation around the longitudinal area of the fiber, such that the spin is impressed on the fiber as it is drawn from the preform, wherein the torque is applied in order to induce mode coupling, and wherein the spin profile is a superposition of two sinusoids, and whereby said mode coupling provides for a reduced PHB, PDG and DOP.

5. Method according to claim 4 wherein the torque is alternately applied in clockwise and counterclockwise direction, such that the spin impressed on the fiber is alternately clockwise and counterclockwise.

6. Method according to claim 5, wherein step c) comprises coating the fiber with a polymer coating and causing the coated fiber to contact a guide roller, wherein the alternating torque is applied by means of said guide roller.

7. Method according to claim 6, wherein applying the torque by means of the guide roller comprises causing the guide roller to oscillate about an axis that is substantially normal to a fiber draw direction.

* * * * *